US006188683B1

United States Patent
Lang et al.

(10) Patent No.: US 6,188,683 B1
(45) Date of Patent: Feb. 13, 2001

(54) SYSTEM AND METHOD FOR ESTABLISHING LONG DISTANCE VOICE COMMUNICATIONS USING THE INTERNET

(75) Inventors: Alexander C. Lang, Ottawa; Mansour Mahammadi, Toronto, both of (CA)

(73) Assignee: Softalk, Inc., Toronto (CA)

( * ) Notice: Under 35 U.S.C. 154(b), the term of this patent shall be extended for 0 days.

(21) Appl. No.: 08/811,099

(22) Filed: Mar. 3, 1997

(51) Int. Cl.[7] .............................. H04L 12/64; H04L 12/66
(52) U.S. Cl. ......................... 370/352; 370/401; 379/229
(58) Field of Search ................................... 370/352, 353, 370/354, 355, 356, 400, 401, 402, 403, 404, 405; 379/90.01, 91.01, 219, 220, 222, 223, 229, 230, 93.01, 93.09

(56) References Cited

U.S. PATENT DOCUMENTS

| | | | |
|---|---|---|---|
| 5,661,790 | * | 8/1997 | Hsu ........................................ 379/230 |
| 5,745,556 | * | 4/1998 | Ronen .................................... 379/127 |
| 5,850,446 | * | 12/1998 | Berger et al. ............................ 380/24 |
| 5,907,547 | * | 5/1999 | Foladare et al. ....................... 370/352 |
| 5,923,659 | * | 7/1999 | Curry et al. ........................... 370/401 |

FOREIGN PATENT DOCUMENTS

| | | |
|---|---|---|
| 22139081 | 6/1996 | (CA) . |
| 0 740 445 | 10/1996 | (EP) . |
| WO 97/28628 | * 7/1997 | (WO) . |

OTHER PUBLICATIONS

C. Yang, "INETPhone: Telephone Services and Servers on Internet," http://ds.internic.net/rfc/rfc 1789.txt, pp. 1–6, Apr. 1995.*

* cited by examiner

Primary Examiner—Ricky Ngo
(74) Attorney, Agent, or Firm—Max R. Wood (57) ABSTRACT

An apparatus and a method for completing long distance telephone calls over the Public Switched Telephone Network (PSTN) using an automated Internet Operator are disclosed. The apparatus includes a long distance service provider node connected to the Internet and a call connection control computer connected to the Internet and interfaced to a toll switch connected to the PSTN. The method permits a calling party to request the automated Internet Operator to complete long distance call connections by connecting to the long distance service provider node and identifying himself. The caller completes a call request form which is uploaded to the long distance service provider node and passed to the call connection control computer for processing. The call connection control computer instructs the toll switch to dial the calling party, dial the called party and conference the two lines. The call control computer preferably uses a least cost routing algorithm to select an interexchange carrier for each call, depending on the origination and termination location of the call. The advantage is a flexible long distance service that is not interexchange carrier dependent for the best long distance rates.

11 Claims, 6 Drawing Sheets

Membership Information

| Field | |
|---|---|
| First Name: | |
| Last Name: | |
| Address: | |
| City: | |
| Country: | |
| Postal (ZIP) Code: | Language [English] |
| Phone Number: | ↖162 |
| Fax Number: | |
| E-mail address: | |
| Credit Card number: | |
| Credit Card expiry date: | |
| Credit Card type: | ○ VISA  ○ MASTERCARD  ○ AMERICAN EXPRESS |
| Choose your User ID: | |
| Choose your password: | |
| Mother's maiden name: | |
| Phone bill per month: | ○ 1-100  ○ 100-250  ○ 250-500  ○ 500-1000 |
| | ○ 1000-2500  ○ 2500-5000  ○ 5000-10000 |

FIG. 4 ↖160

TO MAKE A CALL

Your origination number: [ ]
The termination number: [ ]
Your PIN number: [ ]
Delay for Disconnect? [N]  ─166
[CALL]

To make a call, enter the origination number (normally your telephone number) and the termination number (the person you wish to call). For each number, enter the country code, the area code and the phone number, then enter your PIN number. Click on the CALL button when you are ready to initiate the call.

SYSTEM AND METHOD FOR ESTABLISHING LONG DISTANCE VOICE COMMUNICATIONS USING THE INTERNET

TECHNICAL FIELD

This invention relates to the provision of long distance voice communications involving toll switching systems and, in particular, to a system and a method for establishing long distance voice communications between a calling party having access to a computer which can be connected to the Internet and a telephone connected by a first line to the public switched telephone network (PSTN) and the called party having access to a telephone connected by a second line to the PSTN.

BACKGROUND OF THE INVENTION

The rapid growth of the Internet and it ubiquitous availability in the industrialized world having given rise to new opportunities for facilitating communications, including voice communications using hybrid facilities which include the use of various capabilities of the Internet, privately owned equipment and the PSTN.

One such innovative approach to a telecommunications system is described in Canadian patent application 2,139,081 to A. Gordon which was laid open to public inspection on Jun. 24, 1996. This application is entitled UNIFIED MESSAGING SYSTEM AND METHOD. It describes a method of storing voice, facsimile and electronic mail messages at local service provider nodes accessed through the local public switched telephone network and forwarding those messages to destination nodes connected to the global Internet system where the messages may be retrieved from the destination node by the recipient through the local PSTN. While this facility is capable of storing and forwarding voice messages, it does not support two-way interactive voice communications.

A method and system for establishing voice communications using a computer network is also described in European patent application no. EP 0 740 445 A2 to Dezonno et al. which was published Oct. 30, 1996. This application describes a method and system for arranging for the establishment of voice communications between a computer user and a company sales and/or information agent over the PSTN using a computer network such as the Internet. The computer user connects to the Internet using a browser application and views advertisements of the business products or services via customized home pages owned and maintained by the businesses. When the operator wishes to order a product or ask questions about a product, the user can activate a "call me" option on the home page of interest. Selecting that option returns a call input screen which permits the user to insert his name, telephone number and a time that he wishes to be called. The "call me" information is packatized in a call request which is transmitted over the Internet to a telephone switching system associated with the business. The telephone switching system subsequently dials the users telephone number at the specified time. When the user answers the call, the telephone switching system connects the user with the company agent so that the user may order the product or request additional information. The telephone switching system is preferably a telephone computer and an automatic call distributor. While this system has utility for vendors and service providers who advertise with Internet worldwide web pages, it appears to have no utility that extends beyond conveniently connecting curious or interested web browsers with agents who can provide information and/or sales service. While a caller has an option of selecting the advertiser by which he wishes to be contacted, the caller has no control over the agent to which he will connected. Nor does the caller have an option of placing a call through the PSTN.

Although there is considerable competition is most developed countries for the provision of long distance voice communication services, it remains difficult to ensure that the best long distance service rates are achieved for every long distance call. In North America, telephone service subscribers select a long distance carrier, often referred to as an interexchange carrier or an IXC, who handles all long distance calls made by the subscriber. The theory is that one selects the long distance carrier who provides the best service at the most reasonable price. The practical problem is that long distance carriers may have excellent rates for certain calls and poor rates for other calls because of limitations in the extent of their network, settlement rate agreements, lack of competition or other circumstances which may or may not be beyond their control. Consequently, it is desirable to provide a system which is capable of selecting the least cost rate for any long distance call and, therefore, selecting the long distance carrier based on least cost routing.

Because of the structure of the PSTN in North America, at this time it is not practical to offer subscribers least cost carrier selection based on call destination. As the network is now structured, it is necessary for consumers to select a long distance carrier based on available information respecting their long distance rates. For reasons that are quite understandable, such decisions usually stem from the influence of advertising rather than a thorough analysis of rate structures.

There is a need, therefore, to provide long distance voice communications users with an option of having a tong distance carrier selected based on least cost routing given an area of origination and an area of termination for a long distance call.

SUMMARY OF THE INVENTION

It is an object of the present invention to provide subscribers to the PSTN with a long distance calling option which permits the subscriber to initiate long distance calls which are set up by a call connection control computer connected to the Internet.

It is a further object of the invention to provide subscribers to the PSTN with a long distance calling option whereby the selection of a carrier for any given call is based on the least cost route for completing the call.

It is another object of the invention to provide a long distance voice communication service for subscribers to the PSTN which permits calls to be completed on a global basis to any telephone which may be accessed through the PSTN.

In accordance with the first aspect of the invention there is provided a method of establishing long distance voice communications between an origination number specified by a calling party having access to a computer which can be connected to the Internet and a telephone connected by a first line to the Public Switch Telephone Network (PSTN), and a termination number of a called party having access to a telephone connected by a second line to the PSTN, comprising:

receiving a call request packet from the calling party at the long distance service provider node and sending a call request packet to a call connection control computer connected to the Internet and interfaced with a telephone toll switch connected to the PSTN;

operating the call connection control computer connected to the Internet and interfaced with the telephone toll switch to instruct the toll switch to dial the origination number supplied in the call request packet using a first trunk and to dial the termination number supplied in the call request packet using a second trunk;

operating the call connection control computer interfaced with the telephone toll switch to instruct the switch to conference together the first and second trunks to establish the voice communications between the origination number and the termination number.

In accordance with a further aspect of the invention there is provided an apparatus for establishing long distance voice communications between an origination number supplied by a calling party having access to a computer which can be connected to the Internet and a telephone connected by a first line to the PSTN, and a termination number of a called party having access to a telephone connected by a second line to the PSTN, comprising:

a long distance service provider node accessible by the calling party's computer through the Internet, the node being programmed to:

a) on a one time basis, to download to a calling party's computer a membership identification form and to obtain identification information and verify the credit rating of the calling party on receipt of the completed form;

b) on a per session basis, to download a logon form to identify the calling party and verify the calling party's eligibility to place long distance calls;

c) on a per session basis, in an instance where the calling party is eligible to place long distance calls, to download call request enabling software to permit the calling party to request a long distance call;

d) on a per call basis, to accept a call request from the calling party and to forward the call request to a call connection control computer; the call connection control computer having an interface with a toll switch connected to the PSTN and programmed to:

a) receive the call request from the long distance service provider node and instruct the toll switch through the interface to:

1) dial the origination number using a first trunk;
2) dial the termination number using a second trunk;
3) conference together the first and second trunks; and
4) pass back at least a variable representing a length in time of a duration of the call on call termination;

whereby at least the variable representing the length in time of the duration of the call is stored in a data base by the call connection control computer or returned by the call control computer to the long distance service provider node for storage to permit billing the calling party for the long distance charges for the call.

The method and the apparatus in accordance with the invention therefore provide a novel means of establishing long distance voice communications between a calling party having access to a computer which can be connected to the Internet and a telephone connected to the PSTN and any called party also having a telephone connected to the PSTN. For the purposes of the description which follows "connected to the PSTN" means any telephone set to which a call may be placed to or from the PSTN, including cellular telephones, radio telephones, ship-to-shore telephones and any other voice communications device which is accessible through the PSTN, including a PBX, or the like. It will also be understood by those skilled in the art that the long distance service provider node and the call connection control computer having an interface to the toll switch connected to the PSTN may be the same machine or may be different machines which are geographically co-located or geographically separated.

The method in accordance with the invention permits any subscriber to the PSTN which also has access to the Internet to place a long distance call to any other party not served by the local switch of the PSTN to which the calling party is connected. The method is particularly well adapted for the provision of international calls since the greatest savings are generally to be realized when international calls are made. In accordance with the method, a calling party logs on to the long distance service provider node which is conveniently a world wide web page accessible through the Internet. In order to control access to the calling features of the web page, it is preferable that each user is registered as a member by providing identification information including a credit card number, a debit card number, or the like to which calls can be charged. When a calling party logs on to the web page, the calling party preferably enters a logon name and a password to identify himself. On proper identification, software is downloaded to enable the calling party to initiate a long distance call request. Call initiation can be effected by filling in a call request form which includes the origination number and the termination number or, alternatively, by dialling the origination number and the termination number using a virtual keypad downloaded for that purpose. The calling party's computer prepares a call request packet which is preferably encoded and uploaded to the long distance service provider node. The long distance service provider node extracts the origination and termination numbers from the call request packet and forwards an encrypted packet to the call connection control computer which decrypts the packet and uses the origination and termination numbers to instruct the toll switch to set up the call. Preferably, this selection of the carrier for handling the call is based on least cost routing, whereby a plurality of long distance carriers are available for carrying calls and the selection of a given carrier is based on the most competitive rate for completing the call given the origination and termination locations. After a carrier is selected, the call connection control computer instructs the toll switch in the PSTN to which it is interfaced to dial the calling party's origination number, dial the called party termination number and conference together the two parties so that voice communication between the calling party and the called party is enabled. Preferably, the calling party is provided with a "delay for disconnect" option so that the calling party can disconnect from the Internet if the calling party has only one line available for connection to the PSTN.

As described above, in accordance with the preferred embodiment of the invention, calling parties wishing to use this system are required to complete a membership information form which includes a valid credit card number to which calls are to be billed. When a call is terminated, the toll switch which completed the call connection returns billing information, which includes at least a duration of the call to the call connection control computer which preferably passes that information back to the long distance service provider node. On receipt of the billing information, the long distance service provider node writes a billing record to a billing database and using the credit card number in the calling party's membership record, calls the card issuer for an authorization number for billing the call. If an authorization number is received, the authorization number is recorded in the billing record and the call process is terminated. If an authorization is not received, a "bad credit" flag is set in the membership record and processing is terminated. The "bad credit" flag in the calling party's membership record prohibits further call processing until other billing arrangements are made or the problem is otherwise resolved.

The system in accordance with the invention may be described as an "Internet Operator" which preferably arranges calls by a least cost route. The user interface at the worldwide web site may be plain or sophisticated. It may be as simple as an HTML text interface presented in the language of the users choice. Alternatively, it may be a sophisticated graphic interface with animation, voice prompts, dial pads, telephone directories, time zone indicators and the like.

BRIEF DESCRIPTION OF THE DRAWINGS

The invention will now be explained by way of example only and with reference to the following drawings, wherein.

DETAILED DESCRIPTION OF THE PREFERRED EMBODIMENT

Figure 1:
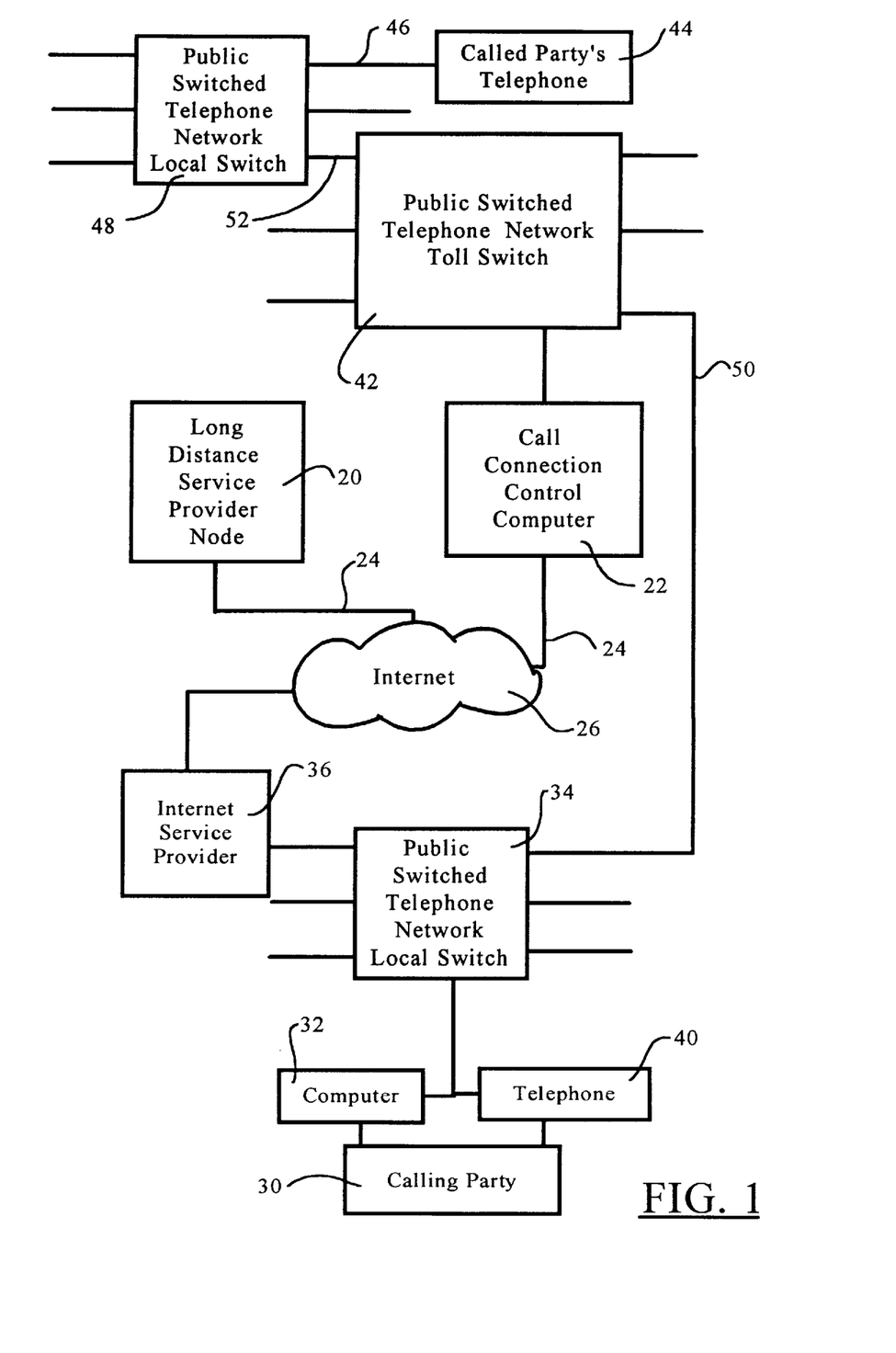
FIG. 1 is a schematic diagram illustrating a preferred arrangement of the apparatus in accordance with the invention.

FIG. 1 is a schematic block diagram of a preferred arrangement of the apparatus in accordance with the invention for establishing long distance voice communications between a calling party having access to a computer which can be connected to the Internet and a telephone connected by a first line to the public switched telephone network (PSTN), and a called party having access to a telephone connected by a second line to the PSTN. The invention may be described as an automated Internet Operator which receives instructions for connecting calls using the PSTN. While a calling party normally uses the automated Internet Operator to connect a call from his telephone to the telephone of a called party, it is possible for a user of the automated Internet Operator in accordance with the invention to connect a call between any two parties. The call will, however, be billed to the account of the user who instructs the automated Internet Operator to establish the long distance voice communications, as will be explained below in further detail.

As shown in FIG. 1, the principle components of the apparatus in accordance with the invention are a long distance service provider node 20 (hereinafter a "LDSP server 20") and a call connection control computer 22 which are respectively connected by communication lines 24 to the Internet 26. While not illustrated for simplicity, the LDSP server 20 and the call connection control computer 22 are, in actual practice, normally connected to an Internet Service Provider (hereinafter an "ISP 36") which in turn provides an interface to the Internet 26. The LDSP server 20 is preferably a world wide web server configured in a manner well known in the art to permit access by a calling party 30 who has access to a computer 32 which can typically access the Internet 26 via a public switched telephone network local switch, (hereinafter referred to as a PSTN local switch) and an ISP 36. The calling party 30 may have one or more telephone lines 38 for access to the PSTN local switch 34. If only one line is available, the calling party's computer 32 and telephone 40 are each connected to the telephone line 38. A calling party 30 will normally access the Internet 26 using a browser application such as Microsoft's Internet Explorer® or Netscape's Navigator®, or a similar browser application, all well known in the art. When the calling party 30 connects to the LDSP server 20, the calling party 30 is provided with a user interface that permits the calling party 30 to learn about the system, register as a member to use the system and, if qualified, place long distance calls using the Internet operator in accordance with the invention. When a calling party 30 instructs the automated Internet Operator to place a long distance call, the LDSP server 20 instructs the call connection control computer 22 to control the public switched telephone network toll switch 42, (hereinafter referred to as the "PSTN toll switch 42"), to establish a connection between the calling party 30 and a called party 44 who is connected to a PSTN local switch 48 by a telephone line 46.

In a simplified overview of the process, the calling party 30 logs on to the LDSP server 20 and requests a call connection between his telephone 40 and a called party's telephone 44. A call request packet is dispatched by the LDSP server 20 to the call connection control computer 22 which is interfaced by a signalling line 28 with the PSTN toll switch 42. The call connection control computer 22 instructs the PSTN toll switch 42 to select a first trunk 50 which connects to the PSTN local switch 34. Although for purposes of clarity, the trunk 50 is shown to connect directly to the PSTN local switch 34, in actual practice the trunk 50 may route through a plurality of toll switches in the PSTN before it reaches the PSTN local switch 34. The call connection control computer 22 then instructs the PSTN toll switch 42 to select a second trunk 52 to establish a voice communications path with the called party's telephone 44 through the PSTN local switch 48. Again, for the purpose of clarity of illustration, the trunk 52 is shown to link directly to the PSTN local switch 48. In actual practice, however, there may be many other PSTN toll switches between the PSTN toll switch 42 and the PSTN local switch 48. It will also understood by those skilled in the art that other links such as satellite links, microwave links, radio links and/or fibre optic trunks may be involved in the call connection. It will also be further understood by those skilled in the art that details such as the PSTN Common Channel Signalling Network (typically a SS7 signalling network) are not illustrated for purposes of clarity. With the exception of the interface between the call connection control computer 22 and the PSTN toll switch 42, the invention is not related to the structure or function of the PSTN. It will also be understood by those skilled in the art that the LDSP server 20 and the call connection control computer 22, although shown as two separate entities may actually be configured on a single computer. It will be further understood by the those skilled in the art that while only one LDSP server 20 and one call connection control computer 22 are illustrated, a plurality of such servers and call control computers may be utilized for establishing long distance voice communications between a calling party 30 and a called party 44.

Figure 4:
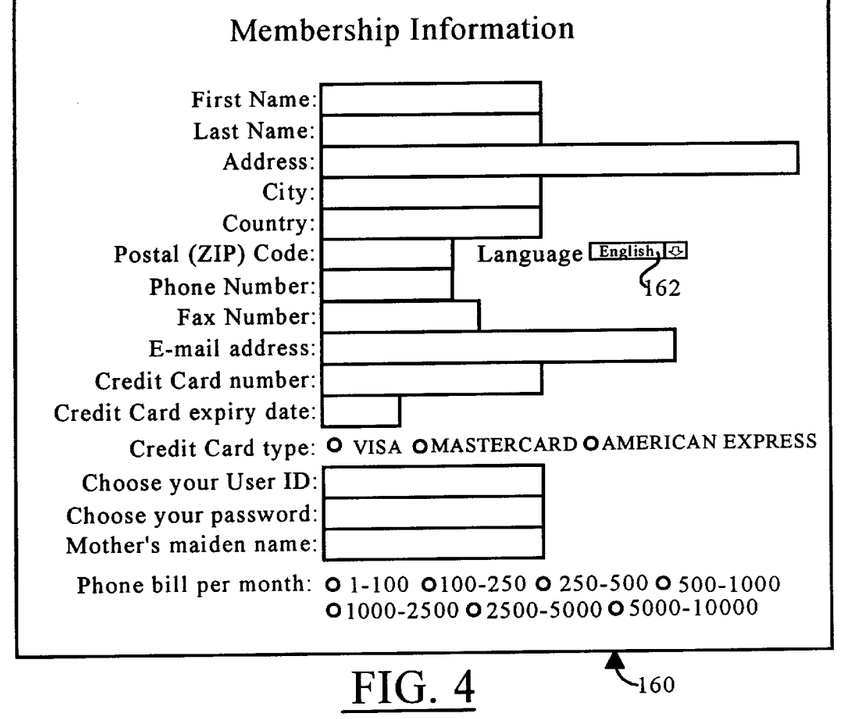
FIG. 4 shows an example of a membership information form which could be used for collecting membership information to enable calling parties to use the long distance calling service in accordance with the invention.

In order to use the system in accordance with the invention to establish long distance voice communications, the calling party 30 must register by entering certain personal identification information in a database associated with the LDSP server 20 in order to enable the system in accordance with the invention to bill calls to the calling party 30. For the purposes of this description, the information required is referred to as "membership information." An overview of the process involved in collection and recording of membership information by the long distance service provider node 20 is illustrated in a flow chart shown in FIG. 2. In a first step 54 of the process the calling party 30 logs on to the ISP 36 in a process well known in the art and using a browser application connects to the LDSP server 20 in a step 56. Following prompts downloaded from the LDSP server 20, the calling party requests a membership form in step 58. The LDSP 20 downloads the membership form in a step 60 and the calling party 30 completes the membership form in a step 62. The information gathered with the membership form is illustrated in FIG. 4, as will be explained below in more detail.

Figure 2:
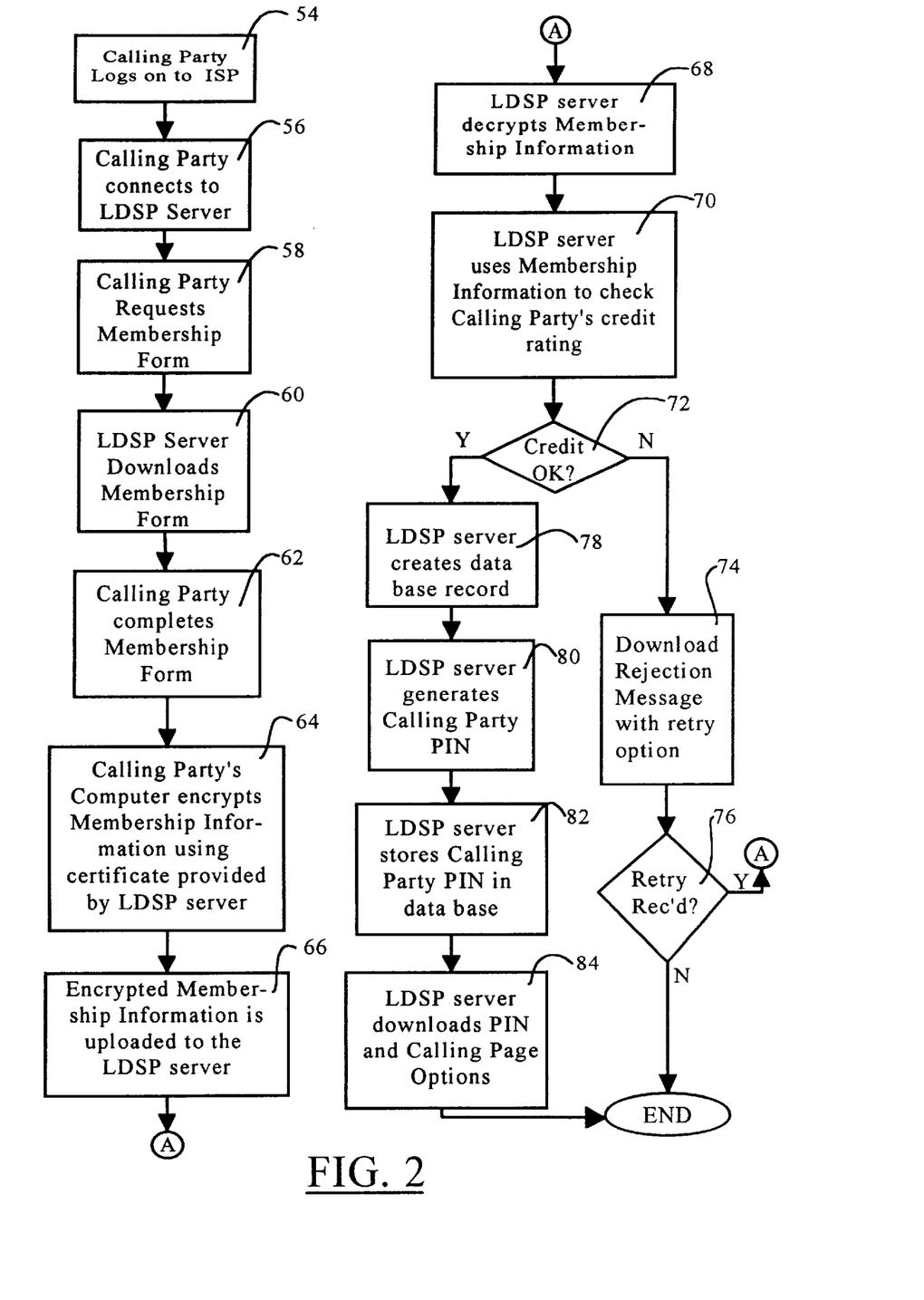
FIG. 2 is a flow chart showing a simplified overview of the principal steps involved in a membership registration process using the apparatus and method in accordance with the invention.

In step 64 the calling party's computer encrypts the membership information using a certificate provided by the LDSP server 20. The encryption by certificate is accomplished by a process well known in the art using a certificate available from an encryption certificate provider such as VeriSign, Inc. of Mountain View, Calif., U.S.A. In step 66, the encrypted membership information is uploaded from the calling party's computer 32 to the LDSP server 20 and the LDSP server decrypts the membership information using the certificate in a step 68. The encryption of the membership information ensures that the calling party's privacy is not breached by a third party intercepting communications between the calling party 30 and the LDSP server 20.

In step 70, the LDSP server uses the membership information, principally the calling party's credit card information, to check the calling party's credit rating. In step 72 the LDSP server 20 determines whether the calling party's credit is acceptable. If the credit check fails, the LDSP server downloads a membership rejection message in step 74 with an option for the calling party to retry, for instance by entering another credit card number or correcting the credit card information entered in the first or subsequent attempts. If a retry is received in step 76, the program branches back to step 68 where the new membership information received at the LDSP server 20 is decrypted and used for a new credit check in step 70. If the credit check in step 72 is acceptable, the LDSP server 20 creates a membership record in a database for the calling party 30 in step 78. The LDSP server 20 then preferably generates a calling party personal identification number (PIN) in step 80. In step 82, the LDSP server 20 stores the calling party's PIN in the membership record of the calling party 30, and in step 84 the LDSP server encrypts and downloads the PIN for the calling party 30, as well as calling page options and other features available only to registered members of the system in accordance with the invention.

Figure 3A:
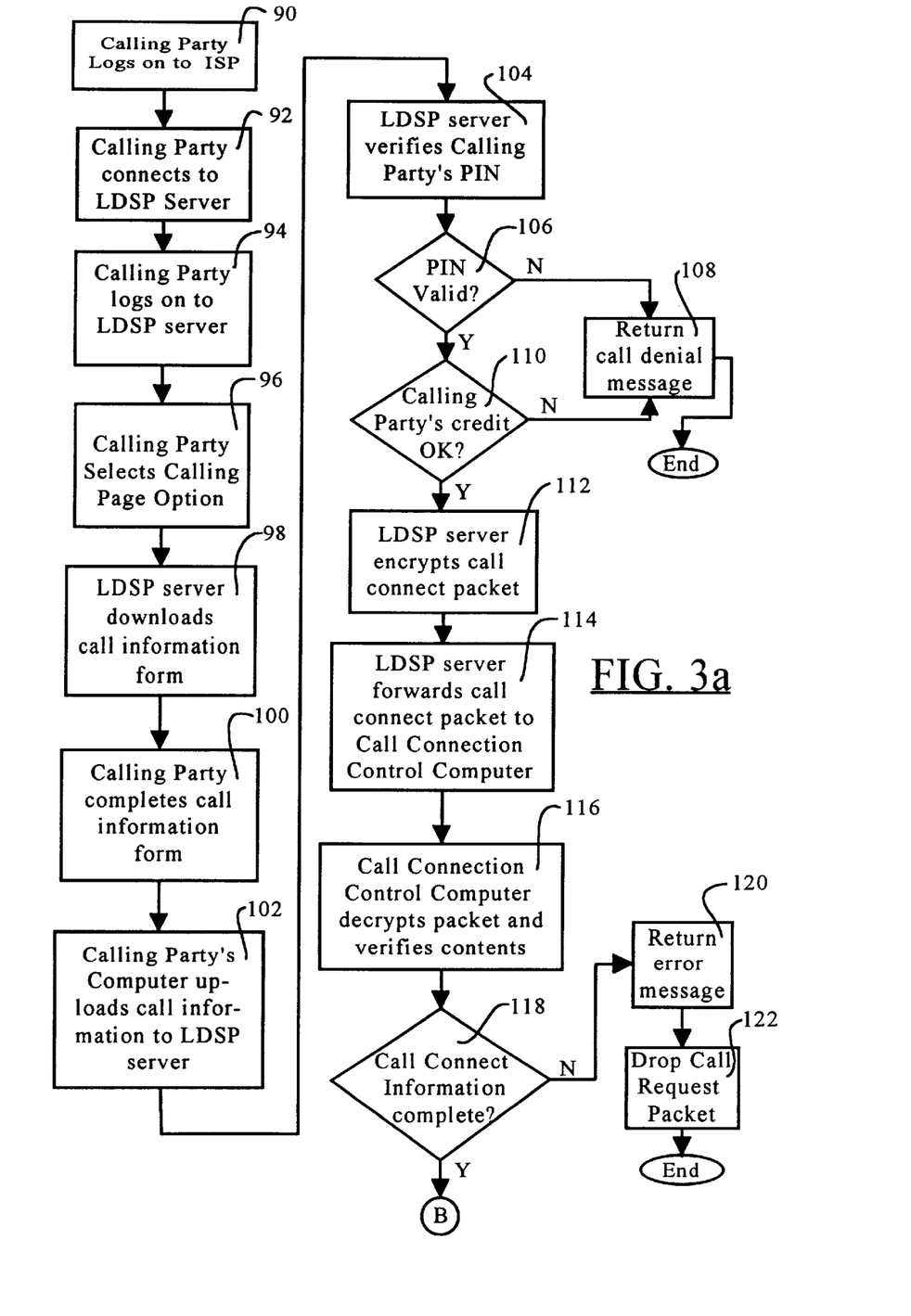
FIGS. 3a and 3b are a flow chart showing an overview of the principal steps involved in establishing long distance voice communications using the method and apparatus in accordance with the invention.
Figure 3B:
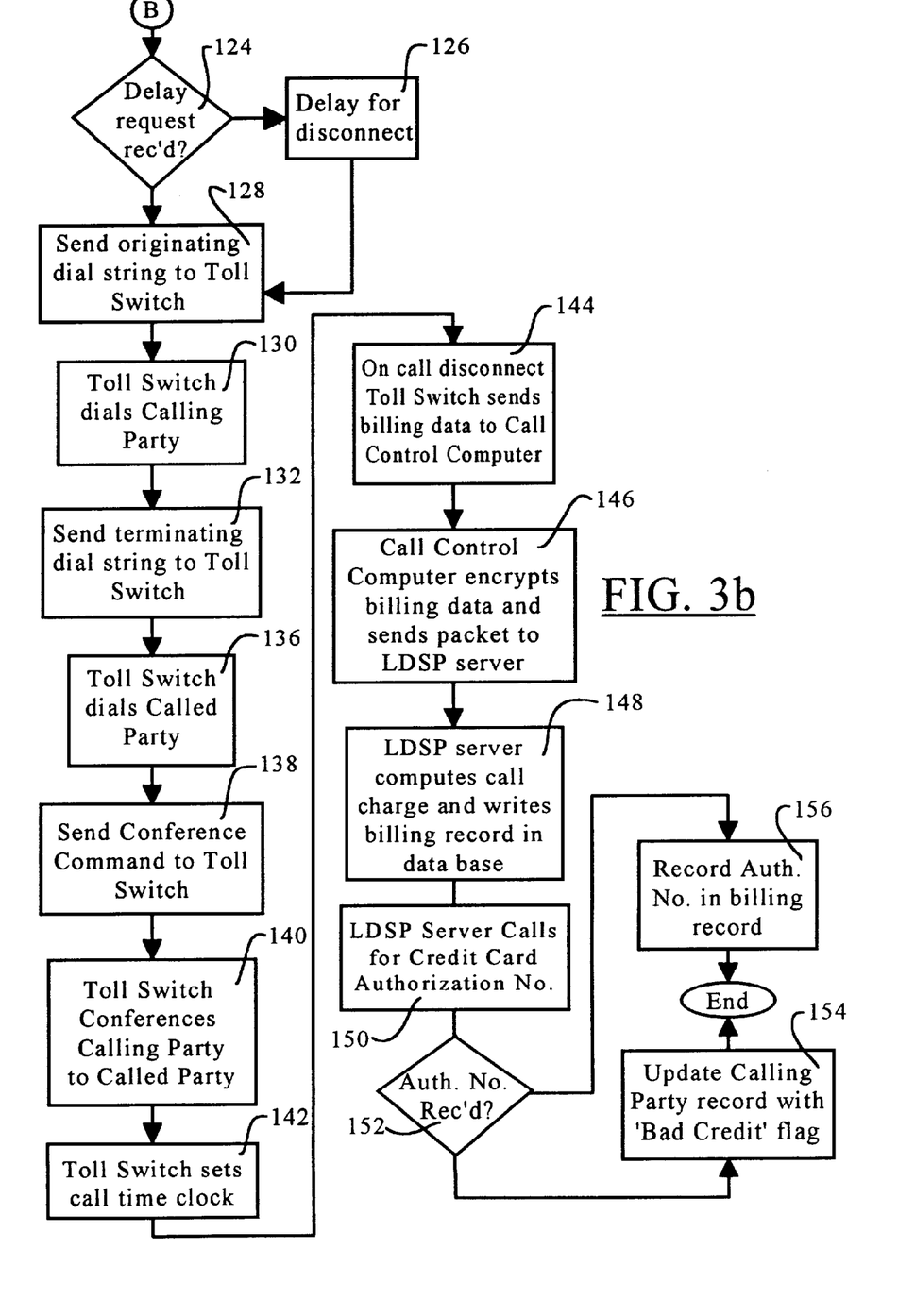

FIGS. 3a and 3b are a flow chart showing an overview of the process of establishing long distance voice communications between a calling party 30 and a called party telephone 40 using the automated Internet Operator in accordance with the invention. In a step 90, the calling party logs on to the ISP 36. In step 92, the calling party 30 connects to LDSP server 20 using an Internet browser application as described above. In step 94, the calling party 30 logs on to the LDSP server 20.

It will be appreciated by those skilled in the art that steps 90–94 are unnecessary in an instance where the calling party is already connected to the LDSP server 20. The purpose of the logon at the LDSP server 20 is to make available options at the user interface which are made available only to registered members of the service. Those options include a calling page option which permits a calling party 30 to set up a long distance voice communication connection on the PSTN, as will be explained below in more detail with reference to FIG. 5. In step 96, the calling party selects the calling page option available after logon and verification that the calling party 30 is entitled to place long distance calls using the system. In step 98, the LDSP server 20 downloads a call information form. Alternatively, the call information form may have been downloaded automatically on successful logon by the calling party 30 in step 94. In step 100, the calling party completes the call information form (see FIG. 4 for an example) and in step 102 the calling party's computer uploads the completed call information form to the LDSP server 20.

As shown in FIG. 4, the call information form preferably includes a field where the calling party 30 enters the PIN number which is used by the LDSP server to ensure that the user identification number and the password of the calling party have not been compromised. This is accomplished in step 104. In step 106, the LDSP server 20 determines whether the PIN is valid by performing a match comparison with the PIN stored in the membership record of the calling party 30. If the PIN is determined not to be valid in step 106, a call denial message is returned in step 108 and further processing of the call request is terminated. If the PIN is determined to be valid in step 106, the credit flag described above in the calling party's membership record is checked in step 110 to ensure that the "bad credit" flag is not set to "Y". If the bad credit flag of the calling party 30 is set to "Y" a call denial message is returned and step 108 and further processing of the call request is terminated. If the calling party's credit is determined to be acceptable in step 110 the LDSP server encrypts a call connect packet in step 112 and forwards the call connect packet in step 114 to the call connection control computer 22. The communications between the LDSP server 20 and the call connection control computer is preferably effected using a protocol such as PPTP (point to point tunnelling protocol) to increase the level of security. In addition, the call connection control computer is preferably provided with software filters well known in the art to ensure that only packets originating from an LDSP server 20 are accepted as valid call connect packets.

In step 116, the call connection control computer decrypts the call connect packet and verifies the contents of the packet. In step 118, the call connection control computer 22 determines whether the call connect information is complete. If the information is not complete, an error message is returned in step 120, the call request packet is dropped in step 122 and processing terminates.

FIG. 3b is a continuation of the flow chart shown in FIG. 3a. If the call connection information is determined to be complete in step 118 (see FIG. 3a) the packet is inspected in step in step 124 to determine whether the calling party has requested a delay to disconnect from the internet 26. This option is made available for calling parties who subscribe to a single line connection to the PSTN. If only a single line is available, the calling party 30 must disconnect from the Internet 26 prior to the connection of voice communications. Otherwise, the toll switch 42 (see FIG. 1) would receive a busy signal when it attempted to connect to the telephone 40 of the calling party 30. If a delay request is received in the call connect packet, the call connection control computer 22 places the call in a delay queue and sets a delay clock to a predetermined expire time (typically 15–30 seconds). In either instance, the call connection control computer 22 signals the PSTN toll switch 42 to dial the telephone 40 of the calling party 30 in step 128. The interface between the call connection control computer 22 and the PSTN toll switch 42 is preferably a dedicated signalling line 28 (see FIG. 1) which may be an Ethernet connection using TCP/IP protocol, RS232 (ASCII stream), a T-1 or a E-1 (DTMF signalling) line, all of which are well known in the art. The selection of the line and the signalling protocol will depend on the type of toll switch to which the call connection control computer 22 interfaces, as is well understood by those skilled in the art.

In step 130, having received the originating dial string from the call connection control computer 22 in step 128, the toll switch dials the calling party in step 130 using methods common to the PSTN. Typically, call set up is accomplished using a Common Channel Signalling System such as SS7, as noted above. In step 132, the call connection control computer 22 sends the terminating dial string to the PSTN toll switch 42 and in step 136, the PSTN toll switch dials the called party. In step 138, the call connection control computer 22 sends a conference command to the PSTN toll switch 42 and in step 140 the toll switch conferences the calling party's line to the called party's line. Preferably, the lines are conferenced together after the calling party 30 picks up the line and before the called party answers the call. It will be understood by those skilled in the art that steps 128–140 can be accomplished in fewer signalling steps, depending on the type of PSTN toll switch 42 and the type of signalling line 28.

In step 142, the toll switch sets a call timer in a typical fashion and in step 144 the toll switch sends billing data back to the call control computer of the signalling line 28 when the PSTN toll switch 42 receives a call disconnect signal over the common channel signalling system (not illustrated). In step 146, the call control computer encrypts the billing data and sends a billing data packet to the LDSP server 20. The LDSP server 20 computes a call charge using the billing data in step 148 and writes a billing record in an associated database which may be accommodated on the LDSP server 20 or may be accommodated on an auxiliary computer in a manner well known in the art. In step 150, the LDSP server 20 or the auxiliary computer (not illustrated) dials a call to the issuer of the calling party's credit card for an authorization number for the charge of the call. In step 152, the LDSP server 20 or the auxiliary computer determines whether an authorization number is received. In the event that an authorization number is not received, the membership information record of the calling party 30 is preferably updated with a "bad credit" flag to indicate that further calls cannot be processed for the calling party until the calling party rectifies the situation or provides a billing alternative. The updating of the calling party's membership record is accomplished in step 154. If an authorization number is returned from the credit card issuer in step 152, the authorization number is recorded in the billing record in step 156 and the call transaction process is terminated.

FIG. 4 shows an example of a membership information form which is used for registering calling parties 30 to enable use of the methods and apparatus in accordance with the invention. The membership information form, generally indicated by reference 160, is an example of information that is typically useful in approving and tracking users of the automated Internet Operator service in accordance with the invention. Other formats and other information may likewise be useful for this purpose. In accordance with the example shown in FIG. 4, the membership form 160 preferably includes such information relating to the calling party 30 as their name and address, their language of preference which is selected from a pull down menu 162 that includes a list of all languages available on the LDSP server 20. The language indication field is used by the LDSP server 20 in downloading software to the computer 32 for the user interface options for the calling party 30 so that the calling party 30 can work in the language of preference insofar as that language is available. The membership information also includes the facsimile and E-mail address of the calling party to permit the LDSP server 20 to download billing records on demand from calling party 30. The membership information also includes a credit card number to which calls placed using the automated Internet Operator are billed. The credit card expiry date permits the LDSP server 20 or an auxiliary computer to verify the credit status of the calling party 30 and to bill long distance calls made to the calling party 30. The type of credit card must also be identified. The member is permitted to choose their user identification and their password which are used each time the calling party 30 connects to the LDSP server 20 after membership registration is complete. As explained above, logging on to the LDSP server 20 prompts the LDSP server 20 to download or to make available user interface options provided only to registered members of the service. A unique identifier such as the maiden name of the mother of the calling party 30 is also requested so that it can be used in case the calling party 30 forgets their user identification or password. The mother's maiden name assists support personal to ensure that a requesting party is actually the calling party 30 identified in the membership information record.

Figure 5:
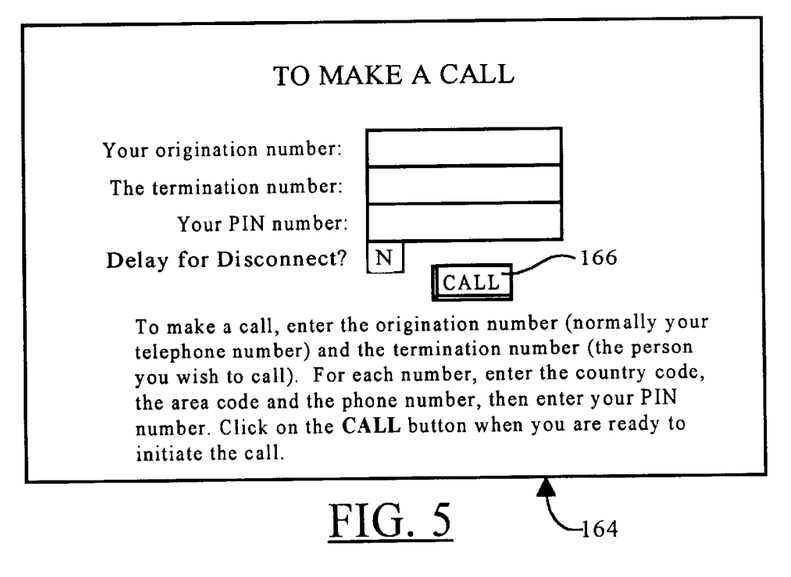
FIG. 5 shows an example of a simple call request form in accordance with the invention.

FIG. 5 shows a second component of the user interface downloaded from the LDSP server 20. FIG. 5 depicts an exemplary call request form 164 which may be used to prompt the calling party 30 for the call information required to establish long distance voice connections on the PSTN. As is apparent, the calling party 30 must enter the origination number for the call. The origination number is typically the number of the telephone 40 connected to telephone line 38 of calling party 30. The calling party 30 may, however, arrange calls to a different telephone line, if desired. The calling party 30 must also enter the termination number, which is the number of the called party telephone 44 with which the calling party 30 wishes to establish voice communications on PSTN. Preferably, the calling party 30 is also requested to enter the PIN number to help ensure that unauthorized persons are not enabled to place calls using the calling party's user identification and password. The PIN number is optional but preferred.

Finally, the calling party must indicate whether he or she wishes the automated Internet Operator to provide a delay for disconnect. As explained above, the delay for disconnect is an option available for calling parties who are connected to the PSTN by a single telephone line 38 so that communications with the Internet and voice communications are handled over the same line. After the call request information is provided in the call request form 164, the user clicks on the call button 166 which initiates the process described in steps 102–156 of FIGS. 3a and 3b and call completion proceeds accordingly.

It will be understood by those skilled in the art, that FIGS. 4 and 5 are representative of possible user interfaces that can be used for the automated Internet Operator in accordance with the invention. It will also be understood by those skilled in the art that other interface options are available including animations, audio prompts, help screens, service information, personal phone books for users and other aids including displays of the time of day at the termination number to enable the calling party to determine whether it is an appropriate time to place an international call, for example.

Figure 6A:
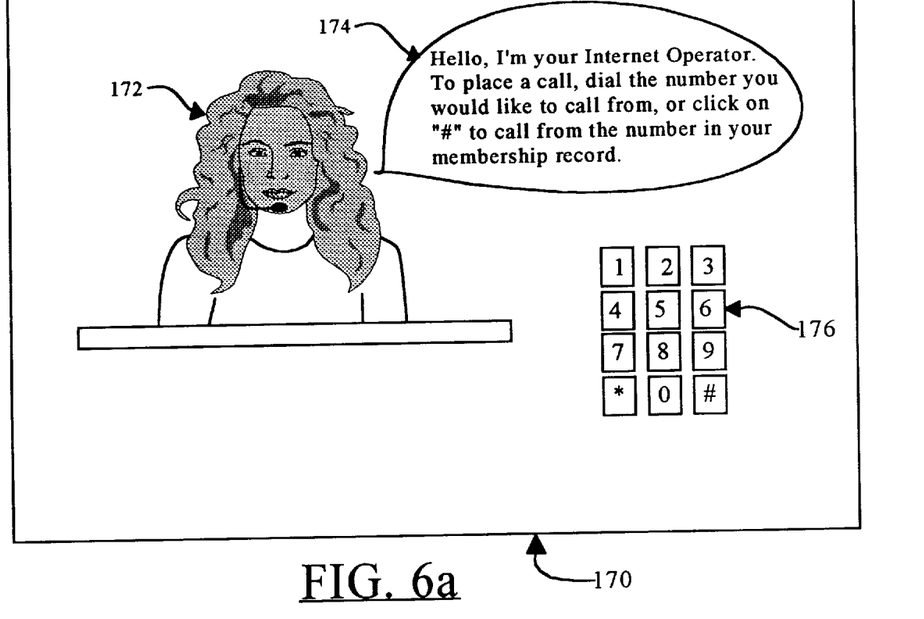
FIGS. 6a and 6b are examples of an animated interface for processing call requests in accordance with the invention.
Figure 6B:
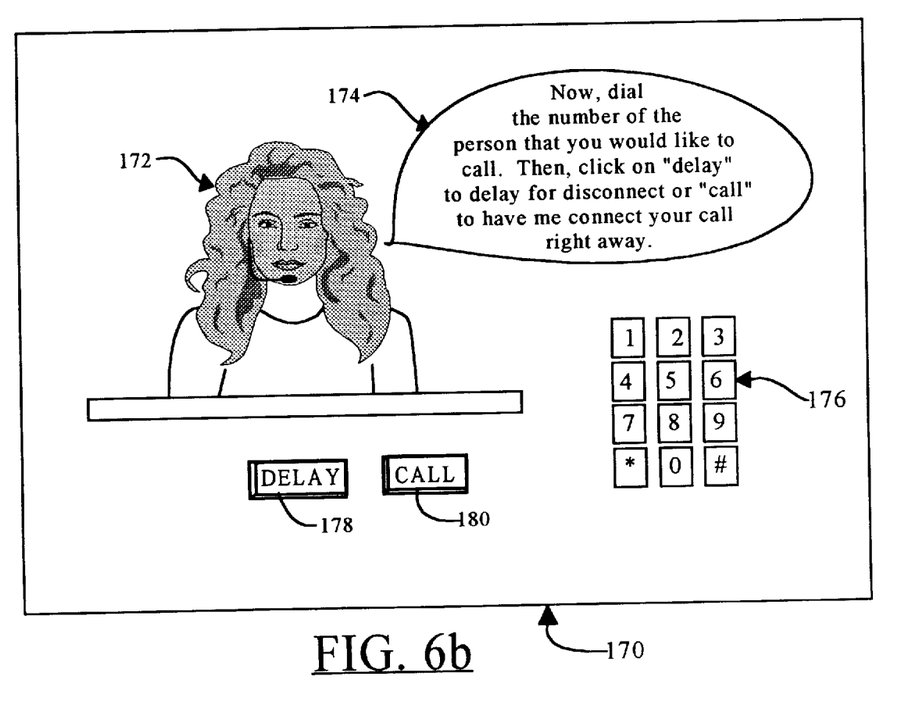

FIGS. 6a and 6b illustrate a portion of an animated user interface in accordance with the invention. This user interface includes a graphical depiction 172 of an Internet Operator. The graphical depiction may be animated to show lip, head and/or body movement or may be a static depiction. In this user interface, speech "bubbles" 174 provide a textual guide to assist the calling party 30 in placing a call. With this interface, a call form as shown in FIG. 5 is not used. Rather, the user manipulates a mouse to click on the numbers of a virtual number pad 176 to dial the origination and termination numbers as if the calling party 30 were using a push-button telephone dial pad. On requesting to place a long distance call, the graphical display 170 shown in FIG. 6a is displayed and the speech bubble 174 displays instructions for dialling the origination number. With this interface, the calling party 30 can select a default "#" to call from the number in his membership record. Since the user may want to use this long distance service from an origination number other than the origination number in his membership record, or may want to set up a call for another calling party, the origination number may also be dialled. After the origination number is entered, the illustration shown in FIG. 6b is displayed and the calling party 30 is requested to dial the termination number followed by a selection of calling immediately or delaying the call for disconnect from the Internet, as described above. In addition to the speech bubbles 174, speech prompts in real-audio format may be downloaded for calling parties 30 having access to a computer 32 with multi-media capability. It will be apparent to those skilled in the art that the complexity of the user interface depends solely on the skill and ingenuity of the designer.

The user interfaces in accordance with the invention are typically written in a computer language such as JAVA, JAVA script, VB script and HTML, all well known in the art. The browser applications described above connect to the LDSP server 20 using HTTP and the HTTPS (secure protocol), also well known in the art. As described above, it is to be understood that the call connection control computer 22 preferably selects interexchange carriers for call completion based on least cost routing algorithms well known in the art in order to provide long distance voice communications at the least cost for each long distance call, domestic or international.

The description of the automated Internet Operator provided above is intended to be exemplary only. The scope of the possible permutations in designing and implementing the apparatus and the methods in accordance with the invention defies a comprehensive enumeration of functional configurations. The scope of the invention is therefore intended to be limited solely by the scope of the appended claims.

We claim:

1. An apparatus for establishing long distance voice communications between an origination number supplied by a calling party having Internet access and a telephone connected by a first line to a public switched telephone network, and a termination number of a called party having access to a telephone connected by a second line to the public switched telephone network, comprising:

a long distance service provider node accessible by the calling party's computer through the Internet, the node being programmed to:

a) on a one time basis, to download to a calling party's computer a membership identification form and to obtain identification information and verify the credit rating of the calling party on receipt of the completed form;

b) on a per session basis, to download a logon form to identify the calling party and verify the calling party's eligibility to place long distance calls;

c) on a per session basis, in an instance where the calling party is eligible to place long distance calls, to download call request enabling software to permit the calling party to request a long distance call;

d) on a per call basis, to accept a call request from the calling party and to forward the call request to a call connection control computer;

the call connection control computer having an interface with a toll switch connected to the public switched telephone network and programmed to:

a) receive the call request from the long distance service provider node and instruct the toll switch through the interface to:

1) establish communications with the origination number using a first trunk;

2) establish communications with the termination number using a second trunk;

3) conference together the first and second trunks; and             4) pass back at least a variable representing a duration of the call on call termination;

whereby at least the variable representing the duration of the call is stored in a data base by the call connection control computer or returned by the call connection control computer to the long distance service provider node for storage in the data base to permit billing the calling party for the long distance charges for the call.

2. The apparatus as claimed in claim 1, wherein the long distance service provider node is a worldwide web server.

3. The apparatus as claimed in claim 1, wherein the long distance service provider node and the call connection control computer are the same machine.

4. The apparatus as claimed in claim 1, wherein the long distance service provider node and the call connection control computer are different machines and each is connected to the Internet.

5. The apparatus as claimed in claim 4, wherein the long distance service provider node and the call connection control computer communicate using a point to point secure protocol.

6. The apparatus as claimed in claim 5, wherein the call connection control computer is further provided with software filters to ensure that any communication not originating from the long distance service provider node is not processed.

7. The apparatus as claimed in claim 2, wherein the long distance service provider node includes a graphical user interface to permit the calling party to request the establishment of long distance voice communications.

8. The apparatus as claimed in claim 7, wherein the graphical user interface is an animated graphical user interface.

9. A method of establishing long distance voice communications on a public switched telephone network, comprising the steps of:

a) providing Internet access with a logon form for accessing a long distance service provider node connected to the Internet;
b) accepting the logon form on an indication that the logon form has been completed by the calling party;
c) verifying entitlement to establish long distance voice communications on the public switched telephone network on receipt of the logon form;
d) enabling access to call request software where entitlement to establish long distance voice communications is verified;
e) accepting a call request including at least an indication of a call origination number and a call termination number for the long distance voice communications to be established between a calling party and a called party; and
f) forwarding the call request to a call connection control computer interfaced with a telephone toll switch connected to the public switched telephone network;

whereby the call connection control computer operates on receipt of the call request to instruct the telephone toll switch to establish communications with the origination number using a first trunk and with the termination number using a second trunk and to conference together the first and second trunks to establish voice communications between the calling party and the called party.

10. The method as claimed in claim 9, wherein the user is the calling party.

11. The method as claimed in claim 9, wherein the step of enabling access to call request software includes downloading call request software.

* * * * *